(12) United States Patent
Shibata et al.

(10) Patent No.: US 11,682,235 B2
(45) Date of Patent: *Jun. 20, 2023

(54) IRIS AUTHENTICATION DEVICE, IRIS AUTHENTICATION METHOD AND RECORDING MEDIUM

(71) Applicant: NEC Corporation, Tokyo (JP)

(72) Inventors: Takashi Shibata, Tokyo (JP); Shoji Yachida, Tokyo (JP); Chisato Funayama, Tokyo (JP); Masato Tsukada, Tokyo (JP); Yuka Ogino, Tokyo (JP); Keiichi Chono, Tokyo (JP); Emi Kitagawa, Tokyo (JP); Yasuhiko Yoshida, Tokyo (JP); Yusuke Mori, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,485

(22) Filed: Feb. 25, 2022

(65) Prior Publication Data

US 2022/0392262 A1 Dec. 8, 2022

Related U.S. Application Data

(63) Continuation of application No. 17/278,719, filed as application No. PCT/JP2018/036033 on Sep. 27, 2018.

(51) Int. Cl.
*G06V 40/18* (2022.01)
*G06V 40/16* (2022.01)
(Continued)

(52) U.S. Cl.
CPC .......... *G06V 40/197* (2022.01); *G06V 40/172* (2022.01); *G06V 40/19* (2022.01); *G06V 40/25* (2022.01); *G06V 40/70* (2022.01)

(58) Field of Classification Search
CPC .. G06V 40/103; G06V 40/161; G06V 40/172; G06V 40/19; G06V 40/197; G06V 40/25; G06V 40/70
See application file for complete search history.

(56) References Cited

U.S. PATENT DOCUMENTS

| 2003/0081817 A1 * | 5/2003 | Nakaigawa ............ G06V 40/67 348/78 |
| 2010/0110374 A1 | 5/2010 | Raguin et al. |

(Continued)

FOREIGN PATENT DOCUMENTS

| JP | 2005-227933 A | 8/2005 |
| JP | 2005227933 A * | 8/2005 |

(Continued)

OTHER PUBLICATIONS

U.S. Office Action for U.S. Appl. No. 17/278,719, dated Jun. 9, 2022.

(Continued)

*Primary Examiner* — Michael J Vanchy, Jr.

(57) ABSTRACT

The disclosure is inputting a first image obtained by capturing an object of authentication moving in a specific direction; inputting a second image at least for one eye obtained by capturing a right eye or a left eye of the object; determining whether the second image is of the left eye or the right eye of the object, based on information including the first image, and outputting a determination result associated with the second image as left/right information; comparing characteristic information relevant to the left/right information, the characteristic information being acquired from a memory that stores the characteristic information of a right eye and a left eye pertaining to object to be authenticated, with characteristic information associated with the left/right information, and calculating a verification score; and authenticating the object captured in the first (Continued)

image and the second image, based on the verification score, and outputting an authentication result.

12 Claims, 9 Drawing Sheets

(51) Int. Cl.
*G06V 40/19* (2022.01)
*G06V 40/70* (2022.01)
*G06V 40/20* (2022.01)

(56) References Cited

U.S. PATENT DOCUMENTS

| | | | |
|---|---|---|---|
| 2010/0290668 A1* | 11/2010 | Friedman | G06V 40/19 348/78 |
| 2014/0266604 A1 | 9/2014 | Masood | |
| 2015/0379254 A1 | 12/2015 | Matsuda et al. | |
| 2017/0076145 A1 | 3/2017 | Gottemukkula et al. | |
| 2017/0112372 A1 | 4/2017 | Chakravorty et al. | |
| 2017/0255823 A1 | 9/2017 | Abe et al. | |
| 2018/0121639 A1 | 5/2018 | Liu et al. | |
| 2019/0188470 A1 | 6/2019 | Su et al. | |
| 2022/0044014 A1* | 2/2022 | Shibata | G06V 40/70 |
| 2022/0180662 A1* | 6/2022 | Shibata | G06V 40/70 |
| 2022/0254193 A1* | 8/2022 | Shibata | G06V 40/161 |

FOREIGN PATENT DOCUMENTS

| | | |
|---|---|---|
| JP | 2009-015518 A | 1/2009 |
| JP | 2010-134735 A | 6/2010 |
| JP | 2016-009363 A | 1/2016 |
| JP | 2018-514046 A | 5/2018 |
| WO | 2009/016846 A1 | 2/2009 |
| WO | WO-2012106728 A1 * | 8/2012 ......... G06K 9/00026 |
| WO | 2016/080031 A1 | 5/2016 |
| WO | 2017/044782 A1 | 3/2017 |
| WO | 2018/038158 A1 | 3/2018 |

OTHER PUBLICATIONS

International Search Report for PCT Application No. PCT/JP2018/036033, dated Oct. 30, 2018.
English translation of Written opinion for PCT Application No. PCT/JP2018/036033, dated Oct. 30, 2018.
Extended European Search Report for EP Application No. EP18935238.8 dated Aug. 26, 2021.
Md. Rabiul Islam, "Feature and Score Fusion Based Multiple Classifier Selection for Iris Recognition", Computational Intelligence and Neuroscience, vol. 2014, Jul. 10, 2014 (Jul. 10, 2014), pp. 1-11.
Leila Zoubida, Reda Adjoudj, "Integrating Face and the Both Irises for Personal Authentication", International Journal of Intelligent Systems and Applications, Mar. 1, 2017 (Mar. 1, 2017), pp. 8-17.
Byung Jun Kang et al., "A new multi-unit iris authentication based on quality assessment and score level fusion for mobile phones", Machine Vision and Applications, Springer, Berlin, DE, vol. 21, No. 4, Feb. 11, 2009 (Feb. 11, 2009), pp. 541-553.
Sowon Yoon et al, "Pan-Tilt-Zoom Based Iris Image Capturing System for Unconstrained User Environments at a Distance", Aug. 27, 2007 (Aug. 27, 2007), ICIAP: International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg, pp. 653-662.

* cited by examiner

Fig.7

| ID | | 1 | 2 | 3 | ... |
|---|---|---|---|---|---|
| RIGHT | CHARACTERISTIC INFORMATION | | | | ... |
| | RELIABILITY SCORE | 80% | 40% | 10% | ... |
| LEFT | CHARACTERISTIC INFORMATION | | | | ... |
| | RELIABILITY SCORE | 20% | 60% | 90% | ... |

15a

IRIS AUTHENTICATION DEVICE, IRIS AUTHENTICATION METHOD AND RECORDING MEDIUM

The present application is a Continuation application of Ser. No. 17/278,719 filed on Mar. 23, 2021, which is a National Stage Entry of PCT/JP2018/036033 filed on Sep. 27, 2018, the contents of all of which are incorporated herein by reference, in their entirety.

TECHNICAL FIELD

The example embodiments relates to an iris authentication device and the like for authenticating an object.

BACKGROUND ART

The personal authentication based on the individual difference of a living body (biometrics-based authentication) has a lower risk of leakage and theft than a password or the like prepared by a user. For this reason, there are increasing examples of introducing the personal authentication based on the individual difference of a living body for the purpose of specifying an individual and confirming the right or for the purpose of security protection. As a personal authentication technique based on the individual difference of a living body, techniques using a fingerprint, a vein, a face, an iris, a voice and the like as biometric information are known. Among these techniques, iris authentication has high authentication accuracy. The reason for this is that the iris pattern is more complicated than the pattern of the fingerprint, and the iris pattern certainly differs from person to person. Once the iris pattern is completed, the pattern does not change or deteriorate thereafter. Unlike the fingerprint, the iris pattern can be recognized without contact, and forgery is difficult. Additionally, the iris pattern is different between the right eye and the left eye even of the same person.

However, when iris authentication is performed, since the iris pattern is different between the right eye and the left eye as described above, it is necessary to identify between the right and left eyes. For the purpose of this identification, for example, there is a technique of identifying between the right and left eyes using the shape of the inner corner of the eye near the iris (see PTL 1). In addition, PTL 2 discloses a technique related to an iris authentication device.

CITATION LIST

Patent Literature

[PTL 1] JP 2005-227933 A
[PTL 2] WO 2009/016846 A

SUMMARY

Technical Problem

However, it is not always possible to identify between the right and left eyes based on the inner corner of the eye, which is a part of the face. For example, the inner corner of the eye sometimes cannot be captured accurately in a case where, for example, a dark shadow is produced on the face, the face is irradiated with strong light, the shape of the inner corner of the eye varies depending on the facial expression, or the inner corner of the eye is hidden by hair or glasses when the face of a user who is an object of authentication is captured. In order to capture the inner corner of the eye in detail from a distance, a telephoto camera with a high magnification and an image analyzing device with a high degree of accuracy are required, which increases the cost.

The disclosure has been made in view of the above disadvantages, and it is an object of the disclosure to provide an iris authentication device and the like that perform iris authentication with a high degree of accuracy by reliably identifying between the right and left eyes.

Solution to Problem

In view of the above disadvantages, an iris authentication device as a first aspect of the disclosure includes:

a first image input means for inputting a first image obtained by capturing an object of authentication moving in a specific direction;

a second image input means for inputting a second image at least for one eye obtained by capturing a right eye or a left eye of the object;

a determination means for determining whether the second image is of the left eye or the right eye of the object, based on information including the first image, and outputting a determination result associated with the second image as left/right information;

a memory means for storing characteristic information on irises of a right eye and a left eye pertaining to one or more objects to be authenticated;

a score calculation means for comparing characteristic information on an iris calculated from the second image associated with the left/right information, with one or more sets of the characteristic information relevant to the left/right information stored in the memory means, and calculating a verification score; and an authentication means for authenticating the object captured in the first image and the second image, based on the calculated verification score, and outputting an authentication result.

An iris authentication method as a second aspect of the disclosure includes:

inputting a first image obtained by capturing an object of authentication moving in a specific direction;

inputting a second image at least for one eye obtained by capturing a right eye or a left eye of the object;

determining whether the second image is of the left eye or the right eye of the object, based on information including the first image, and outputting a determination result associated with the second image as left/right information;

comparing one or more sets of characteristic information relevant to the left/right information, the characteristic information being acquired from a memory means that stores the characteristic information on irises of a right eye and a left eye pertaining to one or more objects to be authenticated, with characteristic information on an iris calculated from the second image associated with the left/right information, and calculating a verification score; and authenticating the object captured in the first image and the second image, based on the calculated verification score, and outputting an authentication result.

An iris authentication program as a third aspect of the disclosure causes a computer to implement:

inputting a first image obtained by capturing an object of authentication moving in a specific direction;

inputting a second image at least for one eye obtained by capturing a right eye or a left eye of the object;

determining whether the second image is of the left eye or the right eye of the object, based on information including the first image, and outputting a determination result associated with the second image as left/right information;

comparing one or more sets of characteristic information relevant to the left/right information, the characteristic information being acquired from a memory means that stores the characteristic information on irises of a right eye and a left eye pertaining to one or more objects to be authenticated, with characteristic information on an iris calculated from the second image associated with the left/right information, and calculating a verification score; and authenticating the object captured in the first image and the second image, based on the calculated verification score, and outputting an authentication result.

The iris authentication program may be stored in a storage medium.

BRIEF DESCRIPTION OF DRAWINGS

FIG. 7 is a diagram illustrating an example of the configuration of data stored in a memory.

EXAMPLE EMBODIMENT

Hereinafter, several example embodiments will be described in detail with reference to the drawings. In the following drawings, the same or similar parts are denoted by the same or similar reference signs. However, the drawings schematically depict the configuration in the example embodiments. Additionally, the example embodiments to be described below are merely examples, and can be modified as appropriate to essentially the same extent.

First Example Embodiment

Information for biometric authentication includes a plurality of pieces of information such as an ultrasound graph, an image of a living body, or voice data. In the following description, images (specifically, iris images) are mainly used for explanation as an example, but this is not intended to limit each example embodiments.

The object of biometric authentication is mainly a living body, and includes a person (user), an animal, and the like. The object includes other than the living body, such as a mannequin. When iris authentication is performed, the right and left eyes (including artificial eyes to be misused for spoofing) of the object of the iris authentication are authenticated. In the following description of each example embodiment, the object of authentication is also referred to as "object user".

(Iris Authentication Device)

Figure 1:
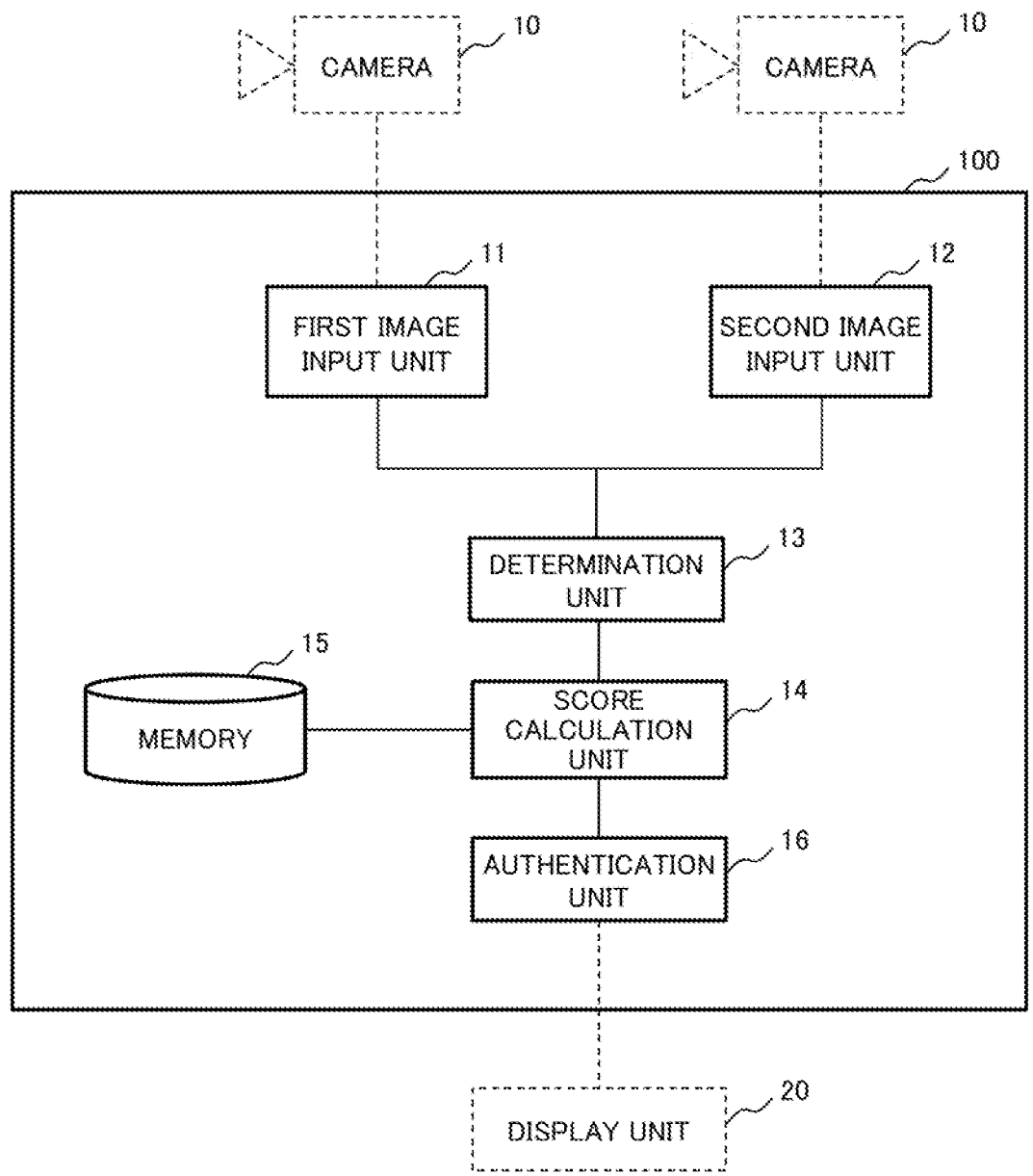
FIG. 1 is a diagram illustrating a configuration example of an iris authentication device according to a first example embodiment of the disclosure.

As illustrated in FIG. 1, an iris authentication device 100 includes a first image input unit 11, a second image input unit 12, a determination unit 13, a score calculation unit 14, a memory 15, and an authentication unit 16.

Figure 2:
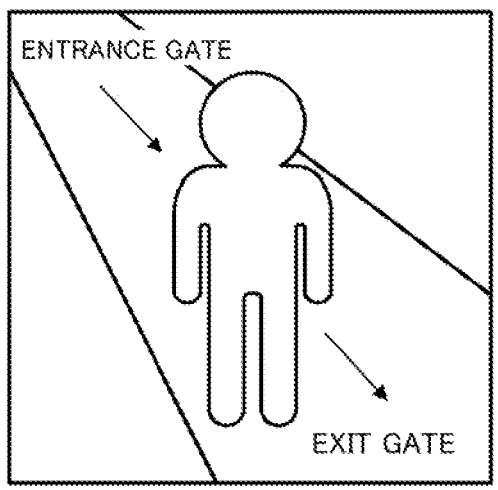
FIG. 2 is a diagram illustrating an example of an image of an object user moving in a specific direction.

The first image input unit 11 and the second image input unit 12 are connected to a camera 10. The camera 10 is a camera for capturing an object to be authenticated. There may be one or a plurality of cameras 10. The camera 10 captures a user moving in a specific direction. Moving in a specific direction means that, for example, in the case of walk-through authentication (that refers to performing biometric authentication while an object user of authentication is moving without stopping), the user walks from the entrance gate to the exit gate of the authentication execution area. The user moving in the specific direction is captured by the camera 10 as an image as illustrated in FIG. 2. The camera 10 is fixed at a position where an image as illustrated in FIG. 2 can be captured (a wall, a gate, and the like). In an image captured by the camera 10, image data of a region including the whole body of the user is input to the first image input unit 11 as a first image, and image data of regions including the right and left eyes of the user and its peripheries are input to the second image input unit 12 as second images. This process of selecting the image region may be performed by the first image input unit 11 and the second image input unit 12 that have received an image from the camera 10. The first image input unit 11 and the second image input unit 12 may receive the input of images of the selected image regions after the camera 10 performs the above process.

The first image input unit 11 receives an input of the first image (see FIG. 3) obtained by capturing a region including the whole body of the user moving in the specific direction, from the camera 10. The first image may be a face image of the user.

Figure 3:
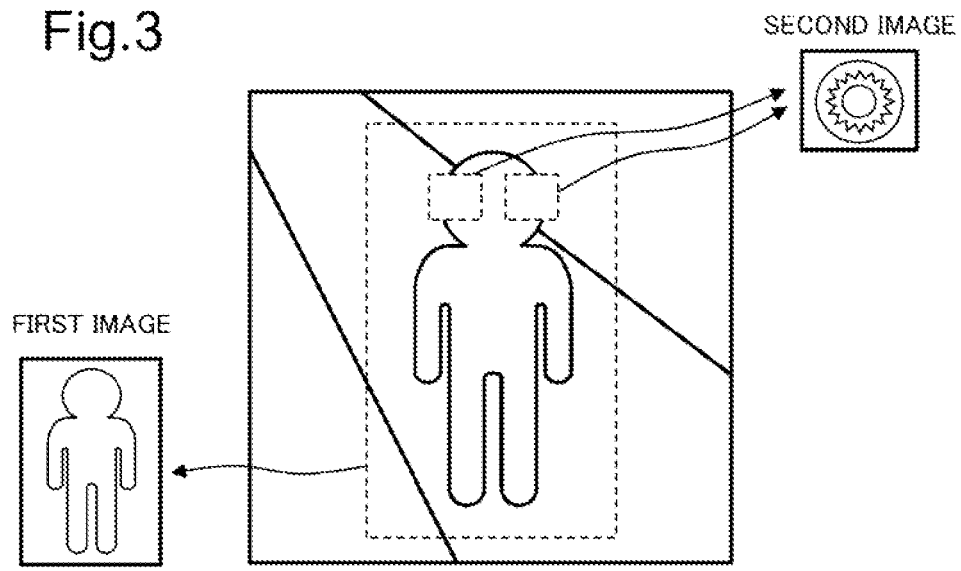
FIG. 3 is a diagram illustrating an example of a first image and a second image acquired from the image of the object user.

The second image input unit 12 receives an input of the second image (see FIG. 3) obtained by capturing at least one of the right eye and the left eye of the user moving in the specific direction, from the camera 10. The second image input unit 12 preferably receives inputs of images for both eyes. However, when the camera 10 cannot acquire the image of one eye (for example, one eye cannot be captured due to bangs over the one eye or the reflection of glasses), an image of the other eye that can be captured is captured. In FIG. 3, while, as an example, the camera 10 uses the left and right eye regions in the whole body image (first image) of the user as an object being captured, as the second image, the left and right eye regions may be enlarged by a telephoto lens and captured.

Figure 4:
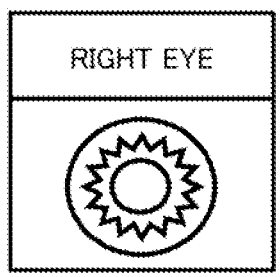
FIG. 4 is a diagram illustrating an example of the second image to which left/right information are associated.

The determination unit 13 determines whether the second image is of the left eye or the right eye of the user, based on information including the first image, and outputs left/right information indicating the determination result, in association with the second image (see FIG. 4). As will be described later, the determination unit 13 outputs the image of the iris part as illustrated in FIG. 4. In the example embodiment, for example, one of the following two approaches is used for determining between the right and left eyes. As the first approach, the determination unit 13 applies a predetermined template for detecting the contour of the face and the positional relationship between both eyes and the like to the region of the user's face in the first image to perform a matching process, and determines whether the second image is of the left eye or the right eye of the user. In order to detect the positional relationship between both eyes, the face of the user needs to face the front with respect to the camera 10. By setting the camera 10 at a position where the user moving toward a predetermined traveling direction can be captured, the user facing the front with respect to the camera 10 can be inevitably placed as an object of the determination. As the second approach, the determination unit 13 compares pixels in the regions of the right eye and the left eye of the user in the first image with pixels in the regions of the right eye or the left eye of the user in the second image, and determines whether the second image is relevant to the left eye or the right eye of the user. In this case, as illustrated in FIG. 3, the determination unit 13 extracts pixels in the region of each of the right eye and the left eye of the user in the first image, which is the image of the whole body, and compares the extracted pixels with pixels in the region of the eye captured in the second image to determine whether the eye captured in the second image is the left or right eye, according to the degree of similarity between the compared pixels. For the comparison between pixels, a contour tracking algorithm using a chain code, a principal component analysis method, a three-dimensional phase-only correlation method, or the like may be used. The approach of determination between the right and left eyes is not limited to the above approaches.

The first image and the second image may be captured at the same timing using two cameras 10. At this time, a telephoto camera capable of capturing at a high magnification may be employed as the camera for capturing the second image. Furthermore, the first image and the second image may be captured at different timings using the same camera 10. At this time, it is preferable that the camera 10 be capable of quickly switching the magnification of the telephoto function for capturing the first image and the second image of the subject.

The memory 15 stores characteristic information on the iris of the right eye and characteristic information on the iris of the left eye for a plurality of users. The characteristic information on the iris is, for example, an iris code (see the characteristic information in FIG. 7) generated based on the Daugman algorithm.

The score calculation unit 14 calculates the characteristic information on the iris from the second image associated with the left/right information (see FIG. 4). A case where the iris code is used as the characteristic information on the iris will be described as an example. The score calculation unit 14 specifies the boundary line of the iris from the image of the iris received from the determination unit 13, and extracts the iris part. Furthermore, the score calculation unit 14 applies a two-dimensional Gabor filter to information on the extracted iris part to encode the iris pattern, and generates the iris code. The iris code is, for example, a 2048-bit digital encoded code.

Here, the second image associated with the left/right information refers to an iris image designated to be the right eye and then tagged as "right eye" by the determination unit 13, or an iris image designated to be the left eye and then tagged as "left eye" by the determination unit 13 (see FIG. 4). An iris code tagged as any one of the right and left eyes may also be employed as the above second image.

The score calculation unit 14 compares the calculated characteristic information with the characteristic information of a plurality of users related to the left/right information, which is stored in the memory 15. Specifically, the score calculation unit 14 makes comparison with the characteristic information on only the right eye stored in the memory 15 in the case of the iris image tagged as the right eye, and makes comparison with the characteristic information on only the left eye stored in the memory 15 in the case of the iris image tagged as the left eye. The score calculation unit 14 obtains a verification score as a result of comparison. The verification score represents a value obtained as a result of calculating the number of bits different between the iris code of the object user and the iris code registered in the memory 15 (Hamming distance calculation). The score calculation unit 14 outputs the verification score to the authentication unit 16.

The authentication unit 16 receives the verification score from the score calculation unit, and authenticates that the user captured in the first image and the second image is a registered user (legitimate user) when the verification score is equal to or more than a predetermined threshold value, while authenticating that the user captured in the first image and the second image is not a registered user when the verification score is equal to or less than a predetermined threshold value. The authentication unit 16 then outputs the authentication result to an external display unit 20. The display unit 20 is a liquid crystal display or the like, and is assumed to be capable of displaying the authentication result in such a way that the object user or an administrator of the authentication execution area can browse the authentication result. In addition, the authentication result may be made known by voice notification by a speaker or a buzzer, lamp lighting, or the like.

(Operation of Iris Authentication Device)

The operation of the iris authentication device 100 according to the first example embodiment will be described with reference to the flowchart in FIG. 5. It is assumed that the memory 15 stores in advance the characteristic information on the irises of the right eye and the left eye pertaining to a plurality of users that can be placed as an object of authentication.

In step S101, the first image input unit 11 receives an input of the first image obtained by capturing an object user of authentication moving in a specific direction. The second image input unit 12 receives an input of the second image at least for one eye obtained by capturing the right eye or the left eye of the object user.

In step S102, it is determined whether the second image is of the left eye or the right eye of the object user, based on information including the first image, and the left/right information indicating the determination result is output in association with the second image.

In step S103, the score calculation unit 14 calculates the verification score obtained by comparing the characteristic information on the iris calculated from the second image associated with the left/right information, with one or more sets of the characteristic information relevant to the left/right information stored in the memory 15.

In step S104, the authentication unit 16 authenticates the user captured in the first image and the second image, based on the calculated verification score, and outputs the authentication result.

As described above, the operation of the iris authentication device 100 ends.

Effects of First Example Embodiment

According to the first example embodiment, iris authentication can be performed by reliably identifying between the right and left eyes. The reason for this is that the determination unit 13 determines whether the second image is of the left eye or the right eye of the user, based on information including the first image, and outputs the determination result associated with the second image as the left/right information.

Second Example Embodiment

While the weights of the authentication of the right and left eyes are the same in the first example embodiment, since the characteristics of the left and right irises are different even for the same person, there are eyes that are easy to identify and eyes that are difficult to identify. Since the time taken for the authentication process is short and the identification accuracy is high for the eyes easy to identify, authentication can be performed with higher accuracy in a shorter time by performing the authentication process using the eye easy to identify regardless of any of the right and left eyes. In a second example embodiment, an iris authentication device and the like that perform an authentication process by weighting the eye easy to identify will be described.

(Iris Authentication Device)

Figure 6:
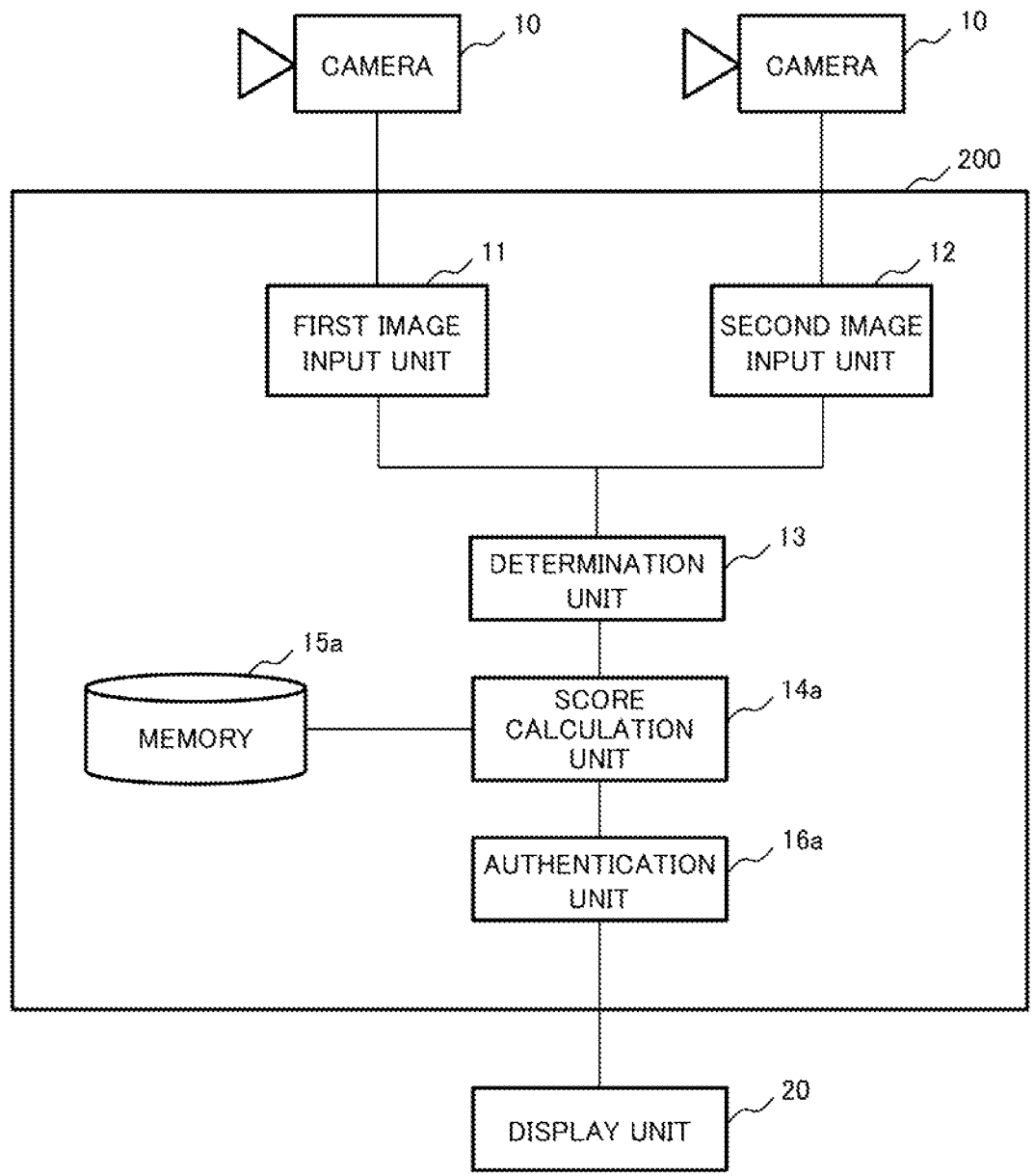
FIG. 6 is a diagram illustrating a configuration example of an iris authentication device according to a second example embodiment of the disclosure.

As illustrated in FIG. 6, an iris authentication device 200 includes a first image input unit 11, a second image input unit 12, a determination unit 13, a score calculation unit 14a, a memory 15a, and an authentication unit 16a. The first image input unit 11 and the second image input unit 12 are connected to an external camera 10. The authentication unit 16a is connected to an external display unit 20.

The memory 15a stores characteristic information and a reliability score of the right eye and characteristic information and a reliability score of the left eye of each user to be placed as an object of authentication for each identifiable identifier (ID) associated with the user. The reliability is a value representing the ease of identification between the object user and other users, and the reliability score is obtained by representing the value of the reliability as 0 to 100%. An example of the calculation method for the reliability score will be mentioned. Assuming that each of the IDs of registered users stored in a second memory 17a is denoted by i (i={1, 2, 3, ..., N}; N denotes the total number of registered users), the characteristic information (characteristic vector) in the iris image of the right eye of each registered user is denoted by $X_{right}(i)$, and the characteristic information (characteristic vector) in the iris image of the right eye of the current object user (a person desired to be verified) is denoted by $Y_{right}$, a correlation between $X_{right}(i)$ and $Y_{right}$ (for example, normalized cross-correlation) is calculated for all registered users i. After the calculation, the ratio (=highest correlation value/second highest correlation value) of the largest correlation value (that is, a correlation value between the correct persons (when the object user is found as a registered user)) to the second largest correlation value (a correlation value between the correct person and a registered user who is the other person with the highest correlation value) is calculated, and the calculated value is employed as a reliability $S_{right}$. Similarly, a similar process is performed for the left eye, and the calculated value is employed as a reliability $S_{left}$. These reliabilities $S_{right}$ and $S_{left}$ are normalized and converted into values from 0% to 100% to obtain reliability scores (for example, 20% for the left eye and 80% for the right eye). Although there are various approaches for normalizing the reliability, for example, the reliability is calculated by the reliability score (%)=100×(S−1)/(M−1) (where 1≤S≤M; S represents either $S_{right}$ or $S_{left}$, and M represents the maximum value of the reliability, the maximum value is preset by a designer or the like, and the reliability in the case of M<S is assumed as 100). The calculation method for the reliability score is not limited to the above. The higher the value of the reliability score is, the easier the characteristic information of the object user is identified (the object user has a rare iris code), compared with the characteristic information of other users. For example, in the case of the user ID "1", since the reliability score of the right eye is 80% and the reliability score of the left eye is 20%, the iris of the right eye of this user is characteristic, which indicates that there are relatively no users who have resembling characteristic information. On the other hand, the iris of the left eye of this user is not very characteristic, which indicates that there are many users who have resembling characteristic information. In such a case, since it is more efficient to use the right eye for the authentication process, it can be said that it is desirable to perform the authentication process using the second image of the right eye even when the second images of both eyes have been successfully captured. On the other hand, when only the second image of the left eye has been successfully captured due to some circumstances, even if the verification score during authentication is low, it can be inferred that this is because the reliability score of the left eye is low, and in this case, the iris authentication device 200 may request the user to retake the iris image. Specifically, the iris authentication device 200 requests this user to move again from the entrance gate to the exit gate for authentication, via the display unit 20 or the like. When an eye with a higher reliability score is hidden by hair or the like, the authentication unit 16a may present, on the display unit 20, text or the like requesting cooperation from the user in such a way that the eye with a higher reliability score can be clearly captured by the camera 10.

The score calculation unit 14a calculates a value obtained by joining the reliability score with the verification score, in addition to the operation of the score calculation unit 14 illustrated in FIG. 1. The score calculation unit 14a calculates the verification score obtained by comparing the characteristic information on the iris calculated from the second image associated with the left/right information, with one or more sets of the characteristic information relevant to the left/right information stored in the memory 15a. Furthermore, the score calculation unit 14a specifies the object user based on the verification score, and acquires the reliability score relevant to the object user from the memory 15a to calculate a score in which the reliability score is reflected on the calculated verification score. For example, in the case of a user having the ID in FIG. 7 of "1", the reliability score of the right eye is 80% and the reliability score of the left eye is 20%. Therefore, when the verification scores of the second images of both eyes have been calculated, the score calculation unit 14a weights the verification score of the right eye with the reliability score of the right eye and the verification score of the left eye with the reliability score of the left eye. At this time, the score calculation unit 14a may increase the priority of the eye having a higher reliability to weight only the verification score of the right eye with the reliability score of the right eye. This makes it possible to obtain a score with higher reliability. The weighting refers to obtaining a calculation result by, for example, multiplying or adding both of the scores, or substituting both of the scores into a predetermined mathematical formula. The authentication unit 16a performs the authentication process using the weighted score.

The operations of the other units are similar to the operations in the first example embodiment.

(Operation of Iris Authentication Device)

The operation of the iris authentication device 200 according to the second example embodiment will be described with reference to the flowchart in FIG. 8. It is assumed that the memory 15a stores in advance the characteristic information and the reliability scores (see FIG. 7) of the irises of the right eye and the left eye pertaining to a plurality of users that can be placed as an object of authentication.

Figure 5:
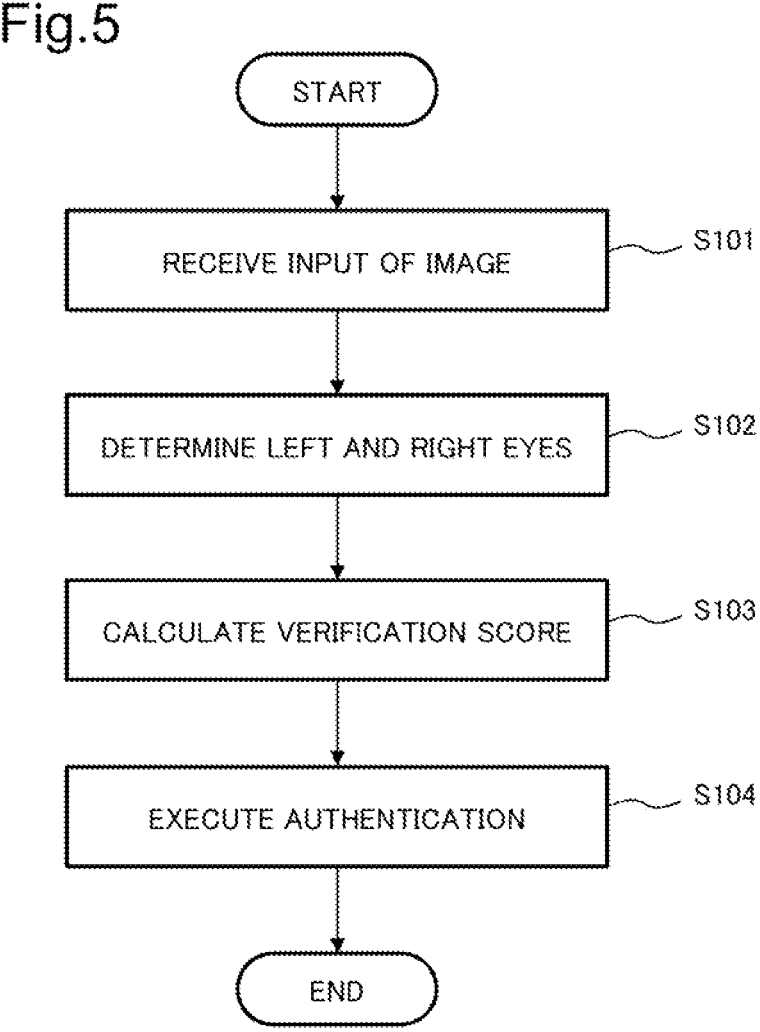
FIG. 5 is a flowchart illustrating the operation of the iris authentication device according to the first example embodiment of the disclosure.

Steps S201 to S203 are similar to steps S101 to S103 in FIG. 5.

In step S204, the score calculation unit 14a specifies the object user in the memory 15a based on the verification score calculated in step S203, acquires the reliability score relevant to the object user from the memory 15a, and weights the calculated verification score with the reliability score (hereinafter referred to as a weighted verification score). At this time, the score calculation unit 14a may put the priority on an eye having a higher reliability to weight the verification score of this eye having the higher priority with the reliability score of this eye.

In step S205, the authentication unit 16a authenticates the object user captured in the first image and the second image, based on the weighted score. Specifically, the authentication unit 16a authenticates that the user captured in the first image and the second image is a registered user (legitimate user) when the weighted verification score is equal to or more than a predetermined threshold value, while authenticating that the user captured in the first image and the second image is not a registered user when the weighted verification score is equal to or less than a predetermined threshold value, and outputs the authentication result to an external display device or the like (not illustrated).

As described above, the operation of the iris authentication device 200 ends.

(Effects of Second Example Embodiment)

According to the second example embodiment, the authentication process can be performed with higher accuracy in addition to the effects of the first example embodiment. The reason for this is that the score calculation unit 14a specifies the object user in the memory 15a based on the calculated verification score, and acquires the reliability score relevant to the object user from the memory 15a, to weight the calculated verification score with the reliability score. Furthermore, the reason for this is that the score calculation unit 14a puts the priority on an eye having a higher reliability to weight the verification score of this eye having the higher priority with the reliability score of this eye.

Third Example Embodiment

While only the iris authentication using the second image is performed in the first and second example embodiments, other biometric authentication (human shape authentication, gait authentication, face authentication, or the like) may be performed using the first image, and multi-modal authentication combining the results of two types of authentication may be performed. This makes it possible to further improve the accuracy of authentication. In the third example embodiment, an iris authentication device and the like in which other biometric authentication is combined will be described. The human shape authentication refers to authentication performed based on the physical characteristics of the object person of authentication (for example, the height, body width, limb lengths, facial contour, and the like, or a combination of these characteristics).

(Iris Authentication Device)

Figure 9:
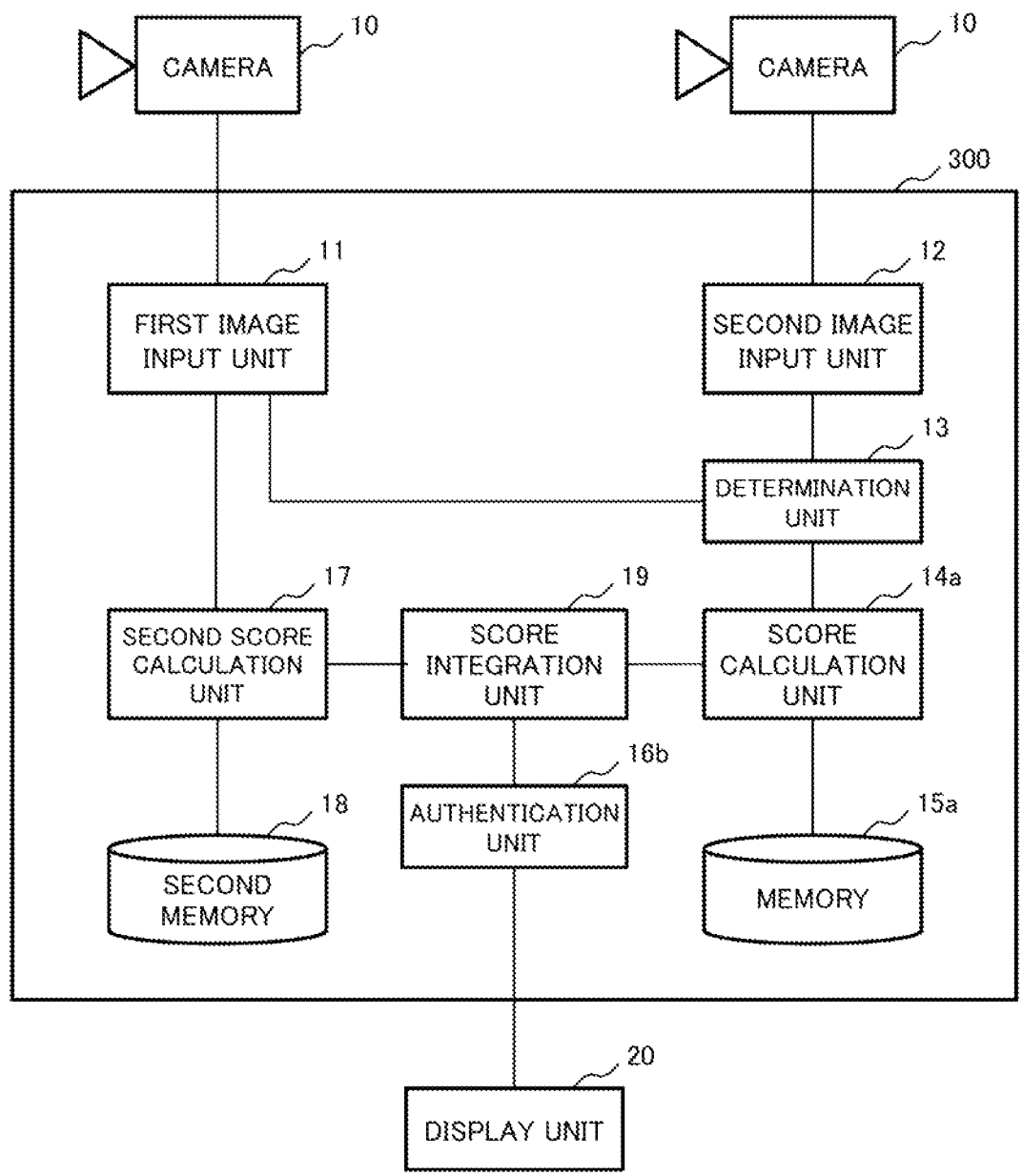
FIG. 9 is a diagram illustrating a configuration example of an iris authentication device according to a third example embodiment of the disclosure.

As illustrated in FIG. 9, an iris authentication device 300 includes a first image input unit 11, a second image input unit 12, a determination unit 13, a score calculation unit 14a, a memory 15a, an authentication unit 16b, a second score calculation unit 17, a second memory 18, and a score integration unit 19. The first image input unit 11 and the second image input unit 12 are connected to an external camera 10. The authentication unit 16b is connected to an external display unit 20.

The second memory 18 stores information (characteristic information on human shape, gait, face, and the like) used during authentication of other biometric authentication (human shape authentication, gait authentication, face authentication, or the like) using the first image.

The second score calculation unit 17 calculates characteristic information of a user to be placed as an object of authentication, from the first image as a second verification score for other biometric authentication.

What type of biometric authentication is to be used by the second score calculation unit 17 may be initially set or the user may be allowed to make this setting. For example, when the first image is a static image or a moving image obtained by capturing the whole body of the user, the second score calculation unit 17 performs human shape authentication using the static image or gait authentication using the moving image, and calculates the second verification score. When the first image is an image obtained by capturing the face of the user, the second score calculation unit 17 performs face authentication using the first image, and calculates the second verification score.

The score integration unit 19 integrates the verification score output from the score calculation unit 14a (or the weighted verification score) with the second verification score output from the second score calculation unit 17, and outputs the result of integration as an integrated score to the authentication unit 16b. In the integration process, the verification score and the second verification score are multiplied, added or substituted into a predetermined mathematical formula to calculate the integrated score.

The authentication unit 16b performs the authentication process using the integrated score.

The operations of the other units are similar to the operations in the first and second example embodiments.

(Operation of Iris Authentication Device)

Figure 10:
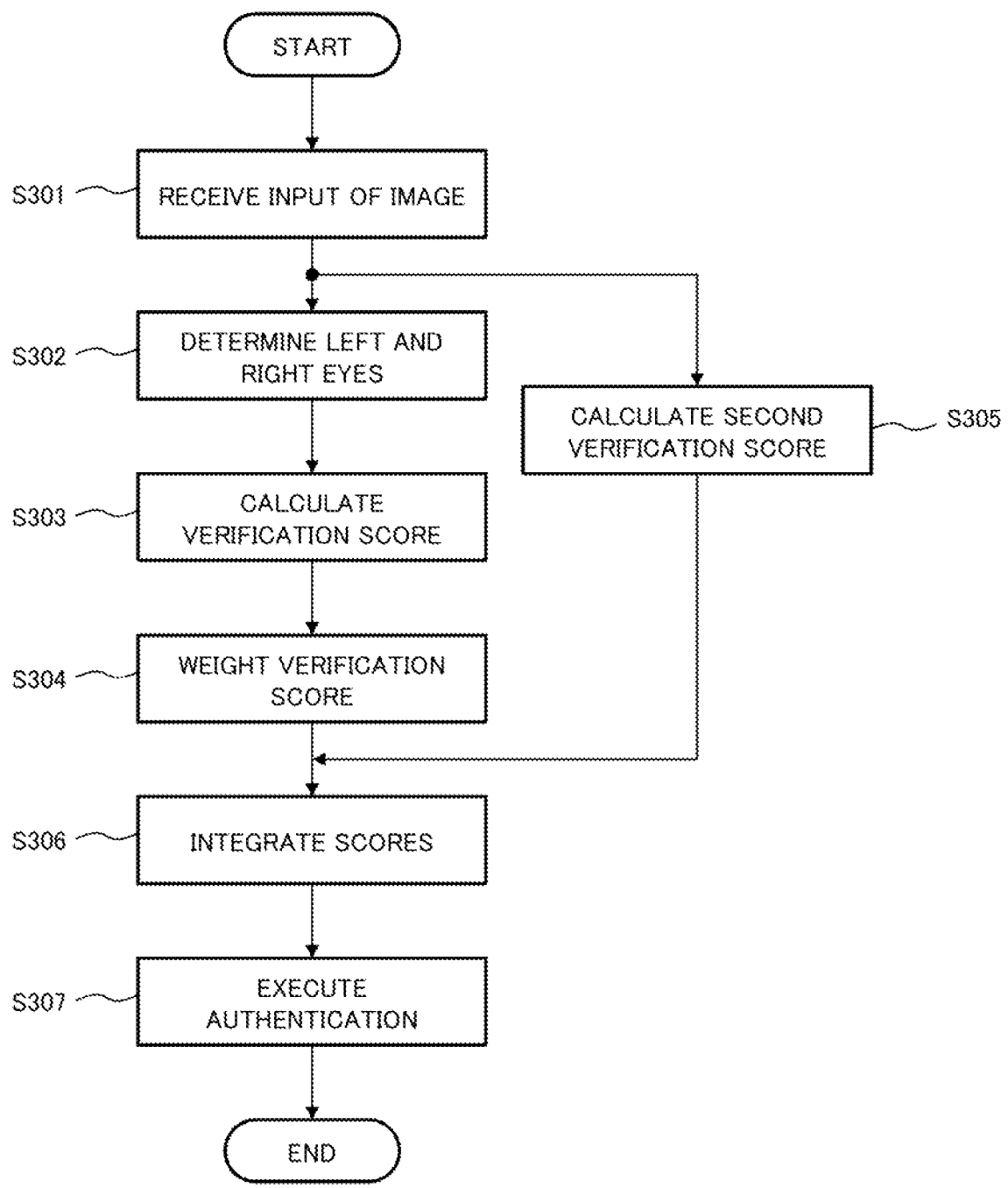
FIG. 10 is a flowchart illustrating the operation of the iris authentication device according to the third example embodiment of the disclosure.

The operation of the iris authentication device 300 according to the third example embodiment will be described with reference to the flowchart in FIG. 10. The memory 15a stores in advance the characteristic information on the irises of the right eye and the left eye pertaining to a plurality of users that can be placed as an object of authentication. Furthermore, the reliability scores (see FIG. 7) may be stored. The second memory 18 stores in advance the characteristic information on the body pertaining to a plurality of users that can be placed as an object of authentication.

Figure 8:
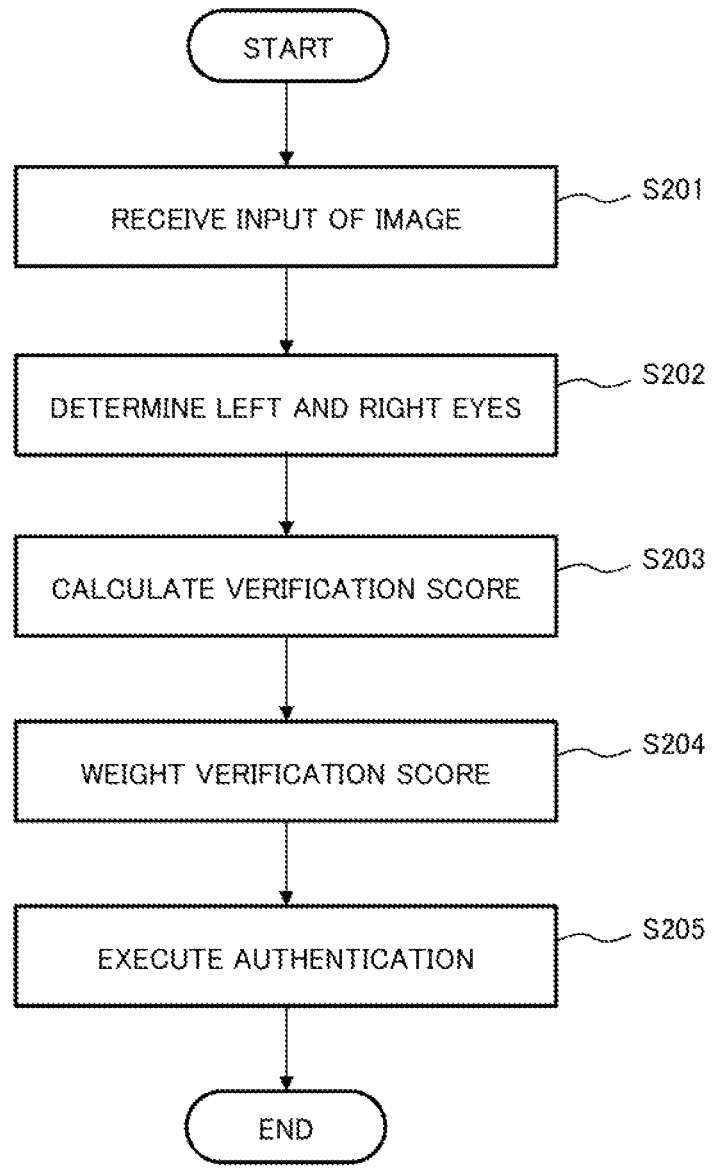
FIG. 8 is a flowchart illustrating the operation of the iris authentication device according to the second example embodiment of the disclosure.

Steps S301 to S304 are similar to steps S201 to S204 in FIG. 8.

In step S305, the second score calculation unit 17 performs biometric authentication (human shape authentication, gait authentication, face authentication, or the like) other than iris authentication using the first image in which the body image of the user is captured, calculates the characteristic information on the body of the user included in the first image, compares the calculated characteristic information with the characteristic information stored in the second memory 18, and outputs the comparison result as the second verification score to the score integration unit 19.

In step S306, the score integration unit 19 calculates the integrated score obtained by joining the second verification score output by the second score calculation unit 17 with the verification score (or the weighted verification score) output by the score calculation unit 14a. The score integration unit 19 outputs the calculated integrated score to the authentication unit 16b.

In step S307, the authentication unit 16b authenticates the user captured in the first image and the second image, based on the calculated integrated score, and outputs the authentication result. Specifically, the authentication unit 16b authenticates that the user captured in the first image and the second image is a registered user (legitimate user) when the integrated score is equal to or more than a predetermined threshold value, while authenticating that the user captured in the first image and the second image is not a registered user when the integrated score is equal to or less than a predetermined threshold value, and outputs the authentication result to the external display device 20 or the like.

As described above, the operation of the iris authentication device 300 ends.

(Effects of Third Example Embodiment)

According to the third example embodiment, the iris authentication device 300 having higher authentication accuracy than the iris authentication devices described in the first and second example embodiments can be provided. The reason for this is that the second score calculation unit 17 calculates the characteristic information from the body image of the object user of authentication included in the first image, and outputs the second verification score, while the score integration unit 19 calculates the integrated score in which the second verification score is reflected on the verification score (or the weighted verification score), and the authentication unit 16b performs the authentication process based on this integrated score.

The example embodiments may be used in combination with each other.

(Information Processing Device)

Figure 11:
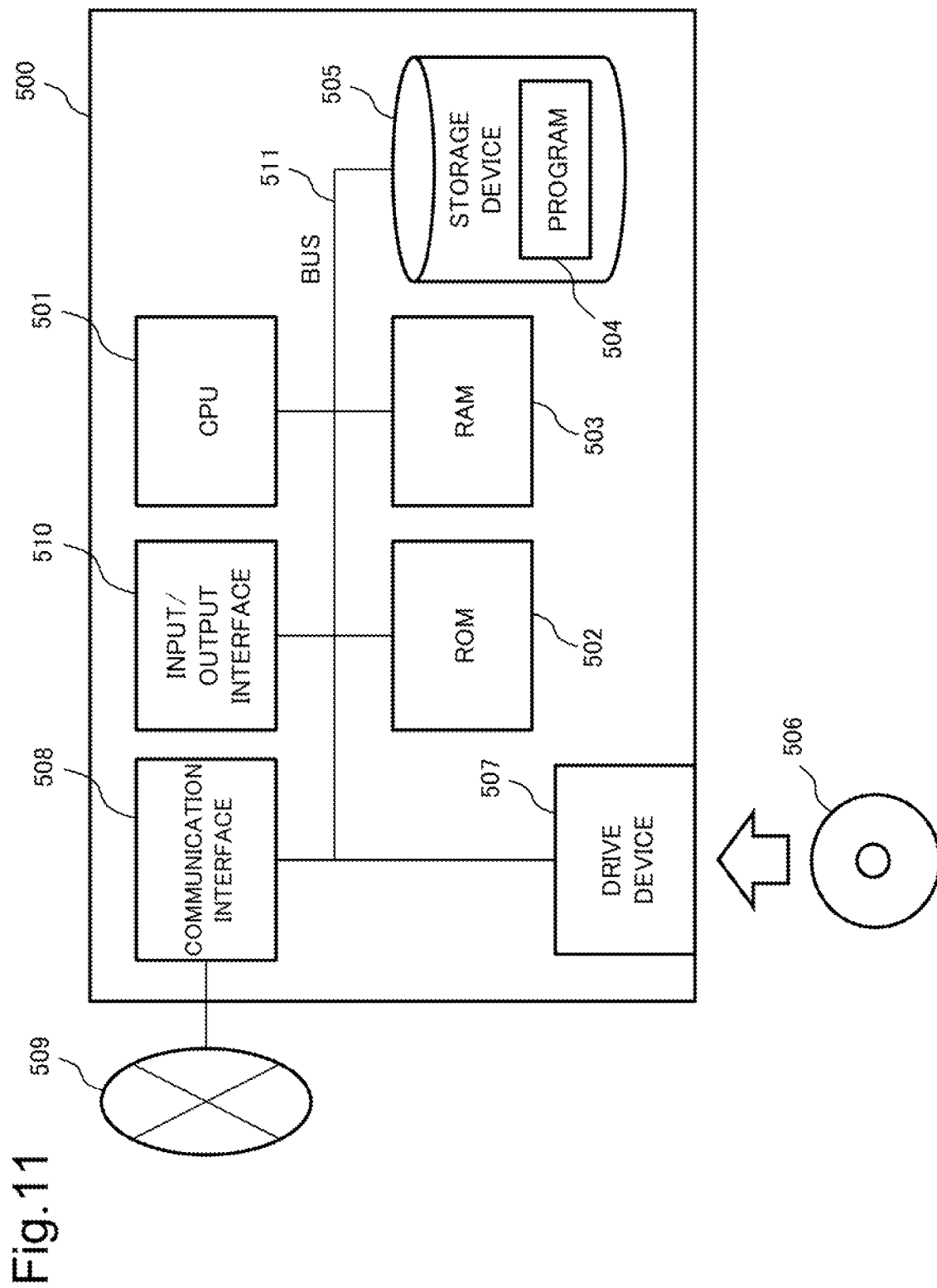
FIG. 11 is a configuration diagram of an information processing device usable in the first to third example embodiments.

In each of the above-described example embodiments, some or all of multiple constituent elements of the iris authentication devices illustrated in FIGS. 1, 6, 9, and other drawings can be achieved using any combination of an information processing device 500 and a program as illustrated in FIG. 11, for example. The information processing device 500 includes, as an example, the following constituents.

Central processing unit (CPU) 501
Read only memory (ROM) 502
Random access memory (RAM) 503
Storage device 505 that stores program 504 and other data
Drive device 507 that performs reading and writing on recording medium 506
Communication interface 508 connected to communication network 509
Input/output interface 510 that inputs and outputs data
Bus 511 that connects between respective constituent elements Each constituent element of the iris authentication device in each example embodiment of the application is achieved by the CPU 501 acquiring and executing the program 504 that enables the functions of these constituent elements. The program 504 that enables the function of each constituent element of the iris authentication device is stored in advance, for example, in the storage device 505 or the RAM 503, and is read out by the CPU 501 as necessary. The program 504 may be supplied to the CPU 501 via the communication network 509, or may be stored in advance in the recording medium 506 in such a way as to be supplied to the CPU 501 by the drive device 507 that has read out the stored program.

The method of achieving each device has various modifications. For example, the iris authentication device may be achieved by any combinations of information processing devices and programs that are separate from each other for each constituent element. A plurality of constituent elements included in the iris authentication device may be achieved by any combination of one information processing device 500 and one program.

Some or all of multiple constituent elements of the iris authentication device are achieved by other general-purpose or dedicated circuitry, processor, or the like, or a combination thereof. These constituent elements may be constituted by a single chip or a plurality of chips connected via a bus.

Some or all of multiple constituent elements of the iris authentication device may be achieved by a combination of the circuitry or the like described above and a program.

In a case where some or all of multiple constituent elements of the iris authentication device are achieved by a plurality of information processing devices, pieces of circuitry, or the like, the plurality of information processing devices, pieces of circuitry, or the like may be centrally arranged or dispersedly arranged. For example, the information processing devices, pieces of circuitry, or the like may be achieved as a form in which the devices or pieces of circuitry or the like are connected with each other via a communication network, such as a client and server system or a cloud computing system.

The whole or part of the example embodiments disclosed above can be described as, but not limited to, the following supplementary notes.

[Supplementary Note 1]

An iris authentication device comprising:

a first image input means for inputting a first image obtained by capturing an object of authentication moving in a specific direction;

a second image input means for inputting a second image at least for one eye obtained by capturing a right eye or a left eye of the object;

a determination means for determining whether the second image is of the left eye or the right eye of the object, based on information including the first image, and outputting a determination result associated with the second image as left/right information;

a memory means for storing characteristic information on irises of a right eye and a left eye pertaining to one or more objects to be authenticated;

a score calculation means for comparing characteristic information on an iris calculated from the second image associated with the left/right information, with one or more sets of the characteristic information relevant to the left/right information stored in the memory means, and calculating a verification score; and an authentication means for authenticating the object captured in the first image and the second image, based on the calculated verification score, and outputting an authentication result.

[Supplementary Note 2]

The iris authentication device according to supplementary note 1, wherein the memory means stores reliability scores of the right eye and the left eye pertaining to the objects to be authenticated, and the score calculation means specifies the object based on the verification score, acquires one of the reliability scores relevant to the object from the memory means, and calculates a weighted verification score obtained by weighting the verification score with the one of the reliability scores.

[Supplementary Note 3]

The iris authentication device according to supplementary note 1 or 2, wherein the score calculation means calculates the weighted verification score by putting priority on an eye having a higher value indicating one of the reliability scores.

[Supplementary Note 4]

The iris authentication device according to any one of supplementary notes 1 to 3, further comprising:

a second memory means for storing characteristic information calculated from body images of one or more objects to be authenticated;

a second score calculation means for calculating characteristic information from a body image of the object included in the first image acquired from the first image input means, comparing the calculated characteristic information with the characteristic information stored in the second memory means, and outputting a comparison result as a second verification score; and a score integration means for calculating an integrated score in which the second verification score output by the second score calculation means is reflected on the verification score or the weighted verification score output by the score calculation means, wherein the authentication means authenticates the object captured in the first image and the second image, based on the verification score, the weighted verification score, or the integrated score, and outputs an authentication result.

[Supplementary Note 5]

The iris authentication device according to supplementary note 4, wherein the first image is a static image or a moving image obtained by capturing a whole body of the object, and the second score calculation means calculates the characteristic information on the body image by executing human shape authentication using the static image or a gait authentication using the moving image.

[Supplementary Note 6]

The iris authentication device according to supplementary note 4, wherein the first image is an image obtained by capturing a face of the object, and the second score calculation means calculates the characteristic information on the body image by executing face authentication using the first image.

[Supplementary Note 7]

The iris authentication device according to supplementary note 1, wherein the determination means applies a predetermined template to a region of a face of the object in the first image, and determines whether the two images are relevant to the left eye or the right eye of the object.

[Supplementary Note 8]

The iris authentication device according to supplementary note 1, wherein the determination means compares pixels in regions of the right eye and the left eye of the object in the first image, with a pixel in a region of the right eye or the left eye of the object in the second image, and determines whether the two images are relevant to the left eye or the right eye of the object.

[Supplementary Note 9]

An iris authentication method comprising:

inputting a first image obtained by capturing an object of authentication moving in a specific direction;

inputting a second image at least for one eye obtained by capturing a right eye or a left eye of the object;

determining whether the second image is of the left eye or the right eye of the object, based on information including the first image, and outputting a determination result associated with the second image as left/right information;

comparing one or more sets of characteristic information relevant to the left/right information, the characteristic information being acquired from a memory means that stores the characteristic information on irises of a right eye and a left eye pertaining to one or more objects to be authenticated, with characteristic information on an iris calculated from the second image associated with the left/right information, and calculating a verification score; and authenticating the object captured in the first image and the second image, based on the calculated verification score, and outputting an authentication result.

[Supplementary Note 10]

The iris authentication method according to supplementary note 9, wherein the memory means stores reliability scores of the right eye and the left eye pertaining to the objects to be authenticated, and the calculating the verification score specifies the object based on the verification score, acquires one of the reliability scores relevant to the object from the memory means, and calculates a weighted verification score obtained by weighting the verification score with the one of the reliability scores.

[Supplementary Note 11]

The iris authentication method according to supplementary note 9 or 10, wherein the calculating the verification score calculates the weighted verification score by putting priority on an eye having a higher value indicating one of the reliability scores.

[Supplementary Note 12]

The iris authentication method according to any one of supplementary notes 9 to 11, further comprising:

calculating characteristic information from a body image of the object included in the first image acquired from the first image input means, comparing the calculated characteristic information with characteristic information stored in a second memory means that stores the characteristic information calculated from body images of one or more objects to be authenticated, and outputting a comparison result as a second verification score; and calculating an integrated score in which the second verification score is reflected on the verification score or the weighted verification score, during the calculating the verification score, wherein the authenticating the object and the outputting the authentication result include authenticating the object captured in the first image and the second image, based on the verification score, the weighted verification score, or the integrated score, and outputting an authentication result.

[Supplementary Note 13]

The iris authentication device according to supplementary note 12, wherein the first image is a static image or a moving image obtained by capturing a whole body of the object, and the outputting the comparison result as the second verification score includes calculating the characteristic information on the body image by executing human shape authentication using the static image or a gait authentication using the moving image.

[Supplementary Note 14]

The iris authentication device according to supplementary note 12, wherein the first image is an image obtained by capturing a face of the object, and the outputting the comparison result as the second verification score includes calculating the characteristic information on the body image by executing face authentication using the first image.

[Supplementary Note 15]

The iris authentication device according to supplementary note 9, wherein the outputting the determination result associated with the second image as the left/right information includes applying a predetermined template to a region of a face of the object in the first image, and determining whether the two images are relevant to the left eye or the right eye of the object.

[Supplementary Note 16]

The iris authentication device according to supplementary note 9, wherein the outputting the determination result associated with the second image as the left/right information includes comparing pixels in regions of the right eye and the left eye of the object in the first image, with a pixel in a region of the right eye or the left eye of the object in the second image, and determining whether the two images are relevant to the left eye or the right eye of the object.

[Supplementary Note 17]

A storage medium storing an iris authentication program for causing a computer to implement:

inputting a first image obtained by capturing an object of authentication moving in a specific direction;

inputting a second image at least for one eye obtained by capturing a right eye or a left eye of the object;

determining whether the second image is of the left eye or the right eye of the object, based on information including the first image, and outputting a determination result associated with the second image as left/right information;

comparing one or more sets of characteristic information relevant to the left/right information, the characteristic information being acquired from a memory means that stores the characteristic information on irises of a right eye and a left eye pertaining to one or more objects to be authenticated, with characteristic information on an iris calculated from the second image associated with the left/right information, and calculating a verification score; and authenticating the object captured in the first image and the second image, based on the calculated verification score, and outputting an authentication result.

[Supplementary Note 18]

The storage medium according to supplementary note 17, wherein the memory means stores reliability scores of the right eye and the left eye pertaining to the objects to be authenticated, and the calculating the verification score specifies the object based on the verification score, acquires one of the reliability scores relevant to the object from the memory means, and calculates a weighted verification score obtained by weighting the verification score with the one of the reliability scores.

[Supplementary Note 19]

The storage medium according to supplementary note 17 or 18, wherein the calculating the verification score calculates the weighted verification score by putting priority on an eye having a higher value indicating one of the reliability scores.

[Supplementary Note 20]

The iris authentication method according to any one of supplementary notes 17 to 19, further comprising:

calculating characteristic information from a body image of the object included in the first image acquired from the first image input means, comparing the calculated characteristic information with characteristic information stored in a second memory means that stores the characteristic information calculated from body images of one or more objects to be authenticated, and outputting a comparison result as a second verification score; and calculating an integrated score in which the second verification score is reflected on the verification score or the weighted verification score, during the calculating the verification score, wherein the authenticating the object and the outputting the authentication result include authenticating the object captured in the first image and the second image, based on the verification score, the weighted verification score, or the integrated score, and outputting an authentication result.

[Supplementary Note 21]

The iris authentication device according to supplementary note 20, wherein the first image is a static image or a moving image obtained by capturing a whole body of the object, and the outputting the comparison result as the second verification score includes calculating the characteristic information on the body image by executing human shape authentication using the static image or a gait authentication using the moving image.

[Supplementary Note 22]

The iris authentication device according to supplementary note 20, wherein the first image is an image obtained by capturing a face of the object, and the outputting the comparison result as the second verification score includes calculating the characteristic information on the body image by executing face authentication using the first image.

[Supplementary Note 23]

The iris authentication device according to supplementary note 17, wherein the outputting the determination result associated with the second image as the left/right information includes applying a predetermined template to a region of a face of the object in the first image, and determining whether the two images are relevant to the left eye or the right eye of the object.

[Supplementary Note 24]

The iris authentication device according to supplementary note 17, wherein the outputting the determination result associated with the second image as the left/right information includes comparing pixels in regions of the right eye and the left eye of the object in the first image, with a pixel in a region of the right eye or the left eye of the object in the second image, and determining whether the two images are relevant to the left eye or the right eye of the object.

While the application has been particularly shown and described with reference to exemplary embodiments thereof, the application is not limited to these embodiments. It will be understood by those of ordinary skill in the art that various changes in form and details may be made therein without departing from the spirit and scope of the example embodiments as defined by the claims.

REFERENCE SIGNS LIST 10 camera
10 first image input unit
12 second image input unit
13 determination unit
14 score calculation unit
14a score calculation unit
15 memory
15a memory
16 authentication unit
16a authentication unit
16b authentication unit
17 second score calculation unit
18 second memory
19 score integration unit
20 display unit
100 iris authentication device
200 iris authentication device
300 iris authentication device
501 CPU
503 RAM
504 program
505 storage device
506 recording medium
507 drive device
508 communication interface
509 communication network
510 input/output interface
511 bus
507 drive device
508 communication interface
509 communication network
510 input/output interface
511 bus

The invention claimed is:

1. An authentication device comprising:
a memory configured to store instructions; and
at least one processor configured to execute the instructions to:
acquire a first image by capturing at least a face of an object of authentication;
acquire a second image by capturing one eye or two eyes of the object of authentication;
determine, when the second image includes the one eye, whether the one eye included is a left eye or a right eye of the object of authentication using the first image;
determine, when the second image includes two eyes, which of the two eyes is the left eye and which of the two eyes is the right eye of the object of authentication, using the first image;
calculate a first verification score with respect to the object of authentication by comparing characteristic information on an iris of the one eye or irises of the two eyes in the second image with one or more sets of the characteristic information calculated from irises of eyes of others stored in a storage;
acquire, as second characteristic information, characteristic information on characteristic selected, by a user, from a plurality of sets of characteristics other than the iris of the one eye or the irises of the two eyes with respect to the object of authentication;
calculate a second verification score with respect to the object of authentication by comparing the second characteristic information with one or more sets of the characteristic information on the selected characteristic of the others stored in the storage;
determine whether the object of authentication is a registrant to be authenticated using the first verification score and the second verification score; and
output the second image,
wherein a plurality of reliability scores of right eyes and left eyes pertaining to each of the plurality of registrants are stored in a storage, each of the plurality of reliability scores representing ease of identification between eyes of others, and
wherein the at least one processor is further configured to execute the instructions to:
specify the object of authentication based on the first verification score;
calculate a weighted verification score by weighting the first verification score with a reliability score stored in the storage with respect to the specified object of authentication; and
determine whether the object of authentication is the registrant using the weighted verification score instead of the first verification score and the second verification score.

2. The authentication device according to claim 1, wherein the at least one processor calculates the weighted verification score using the higher of the reliability score of the left eye and the reliability score of the right eye with respect to the object of authentication.

3. The authentication device according to claim 1, wherein the first image includes a body image of the object of authentication, and
wherein the second characteristic information is characteristic information calculated from the body image in the first image.

4. The authentication device according to claim 3, wherein the first image is a static image or a moving image by capturing a whole body of the object of authentication, and
wherein the at least one processor calculates the characteristic information on the body image by executing a human shape authentication using the static image or a gait authentication using the moving image.

5. An authentication method comprising:
by at least one processor,
acquiring a first image by capturing at least a face of an object of authentication;
acquiring a second image by capturing one eye or two eyes of the object of authentication;
determining, when the second image includes the one eye, whether the one eye included is a left eye or a right eye of the object of authentication using the first image;
determining, when the second image includes the two eyes, which of the two eyes is the left eye and which of the two eyes is the right eye of the object of authentication, using the first image;
calculating a first verification score with respect to the object of authentication by comparing characteristic information on an iris of the one eye or irises of the two eyes in the second image with one or more sets of the characteristic information calculated from irises of eyes of others stored in a storage;
acquiring, as second characteristic information, characteristic information on characteristic selected, by a user, from a plurality of sets of characteristics other than the iris of the one eye or the irises of the two eyes with respect to the object of authentication;

calculating a second verification score with respect to the object of authentication by comparing the second characteristic information with one or more sets of the characteristic information on the selected characteristic of the others stored in the storage;

determining whether the object of authentication is a registrant to be authenticated using the first verification score and the second verification score; and outputting the second image, wherein a plurality of reliability scores of right eyes and left eyes pertaining to each of the plurality of registrants are stored in a storage, each of the plurality of reliability scores representing ease of identification between eyes of others, and wherein the authentication method further includes, by the at least one processor, specifying the object of authentication based on the first verification score;

calculating a weighted verification score by weighting the first verification score with a reliability score stored in the storage with respect to the specified object of authentication; and determining whether the object of authentication is the registrant using the weighted verification score instead of the first verification score and the second verification score.

6. The authentication method according to claim 5, wherein the at least one processor calculates the weighted verification score using the higher of the reliability score of the left eye and the reliability score of the right eye with respect to the object of authentication.

7. The authentication method according to claim 5, wherein the first image includes a body image of the object of authentication, and wherein the second characteristic information is characteristic information calculated from the body image in the first image.

8. The authentication method according to claim 7, wherein the first image is a static image or a moving image by capturing a whole body of the object of authentication, and wherein the at least one processor calculates the characteristic information on the body image by executing a human shape authentication using the static image or a gait authentication using the moving image.

9. A non-transitory storage medium storing a computer program for causing a computer to implement:

acquiring a first image by capturing at least a face of an object of authentication;

acquiring a second image by capturing one eye or two eyes of the object of authentication;

determining, when the second image includes the one eye, whether the one eye included is a left eye or a right eye of the object of authentication using the first image;

determining, when the second image includes the two eyes, which of the two eyes is the left eye and which of the two eyes is the right eye of the object of authentication, using the first image;

calculating a first verification score with respect to the object of authentication by comparing characteristic information on an iris of the one eye or irises of the two eyes in the second image with one or more sets of the characteristic information calculated from irises of eyes of others stored in a storage;

acquiring, as second characteristic information, characteristic information on characteristic selected, by a user, from a plurality of sets of characteristics other than the iris of the one eye or the irises of the two eyes with respect to the object of authentication;

calculating a second verification score with respect to the object of authentication by comparing the second characteristic information with one or more sets of the characteristic information on the selected characteristic of the others stored in the storage;

determining whether the object of authentication is a registrant to be authenticated using the first verification score and the second verification score; and outputting the second image, wherein a plurality of reliability scores of right eyes and left eyes pertaining to each of the plurality of registrants are stored in a storage, each of the plurality of reliability scores representing ease of identification between eyes of others, and wherein the computer program further causes the computer to implement:

specifying the object of authentication based on the first verification score;

calculating a weighted verification score by weighting the first verification score with a reliability score stored in the storage with respect to the specified object of authentication; and determining whether the object of authentication is the registrant using the weighted verification score instead of the first verification score and the second verification score.

10. The non-transitory storage medium according to claim 9, wherein the computer program further causes a computer to implement:

calculating the weighted verification score using the higher of the reliability score of the left eye and the reliability score of the right eye with respect to the object of authentication.

11. The non-transitory storage medium according to claim 9, wherein the first image includes a body image of the object of authentication, and wherein the second characteristic information is characteristic information calculated from the body image in the first image.

12. The non-transitory storage medium according to claim 11, wherein the first image is a static image or a moving image by capturing a whole body of the object of authentication, and wherein the computer program further causes a computer to implement:

calculating the characteristic information on the body image by executing a human shape authentication using the static image or a gait authentication using the moving image.

* * * * *